March 15, 1966  G. K. NEWELL  3,240,078
INFINITELY VARIABLE SPEED RATIO CHANGING DEVICE
Filed Oct. 31, 1963  2 Sheets-Sheet 1
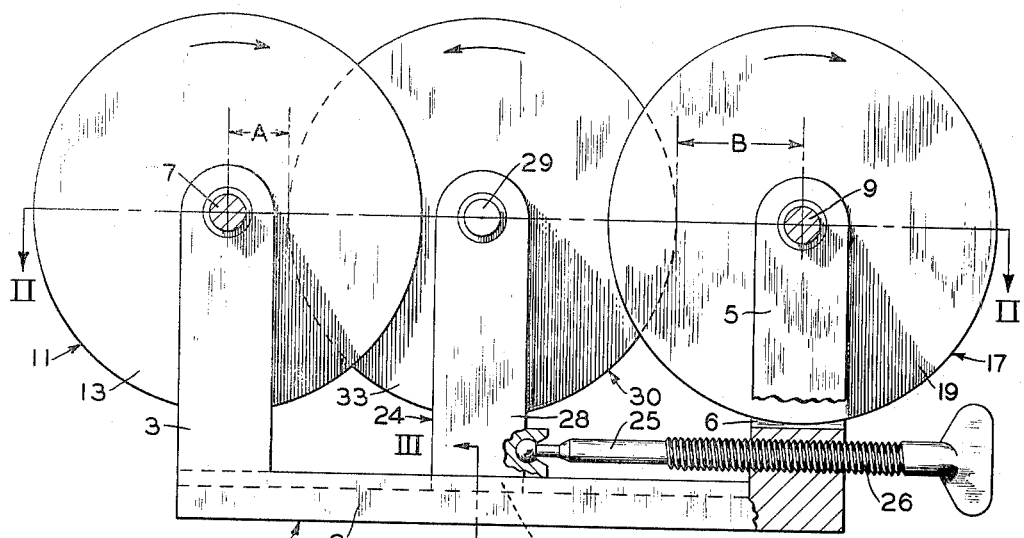
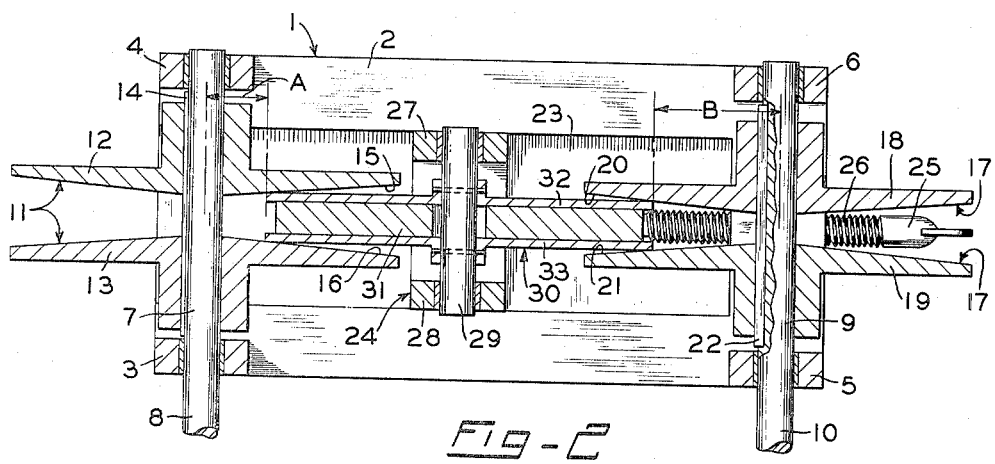
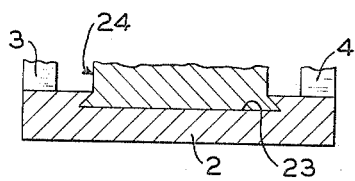
INVENTOR.
GEORGE K. NEWELL
BY
*A. A. Steinmiller*
ATTORNEY March 15, 1966  G. K. NEWELL  3,240,078
INFINITELY VARIABLE SPEED RATIO CHANGING DEVICE
Filed Oct. 31, 1963  2 Sheets-Sheet 2
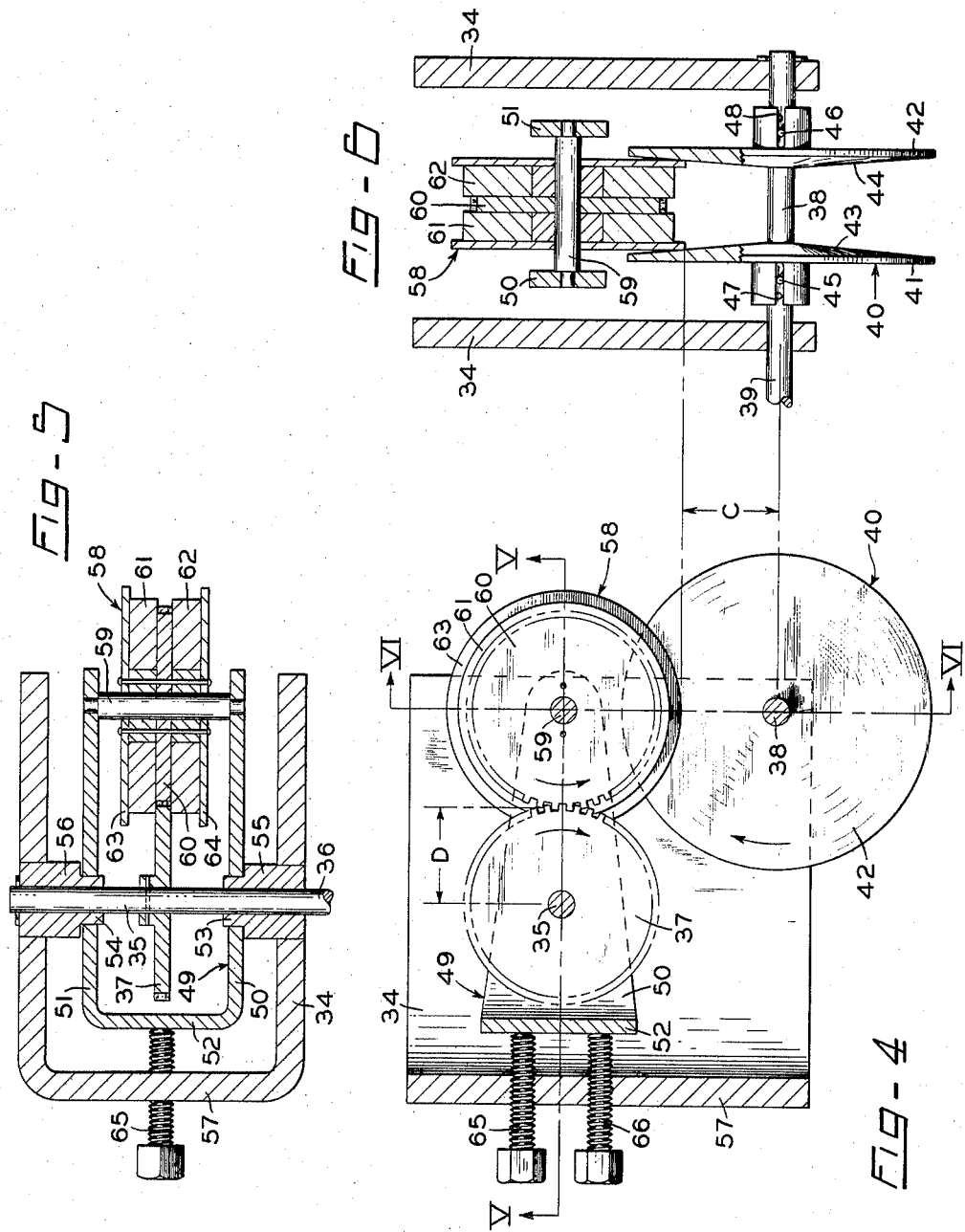
INVENTOR.
GEORGE K. NEWELL
BY A. A. Steinmiller
ATTORNEY

United States Patent Office 3,240,078
Patented Mar. 15, 1966

3,240,078
INFINITELY VARIABLE SPEED RATIO
CHANGING DEVICE
George K. Newell, Penn Township, Westmoreland
County, Pa., assignor to Westinghouse Air Brake Company, Wilmerding, Pa., a corporation of Pennsylvania
Filed Oct. 31, 1963, Ser. No. 320,460
6 Claims. (Cl. 74—200)

This invention relates to infinitely variable speed ratio changing devices and more, specifically, to such a device which employs a magnetic element for maintaining maximum traction between an idler disc and driving and driven discs regardless of the relative radial distances between the respective axes of said discs when adjusted to the desired speed ratio.

Since the speed ratio changing devices of the type above mentioned are usually friction driven, they mostly rely on mechanical means, such as springs or the like, for providing the tractive friction between the idler disc and the driving and driven discs for transmitting the driving torque from the driving disc, through the idler disc, to the driven disc. Such an arrangement, however, can be objectionable in that the tractive friction between the idler disc and the other discs may be seriously reduced when an adjustment in speed ratio is made by shifting the position of the idler disc relative to the driving and driven discs and thereby result in a corresponding reduction in torque transmission.

The principal object of the present invention, therefore, is to provide a speed ratio changing device of the above-described type having means for maintaining maximum tractive friction between the idler disc and the driving and driven discs and, therefore, maximum torque transmission regardless of the adjusted position of said idler disc relative to the other discs. Briefly, the speed ratio changing device embodying the invention comprises a rotatable driving element, a rotatable driven element and a rotatable idler frictionally engageable between said driving and driven elements for transmitting torque from the former to the latter. The idler is positionably adjustable between the driving and driven elements in such a manner as to vary the respective radial distances between the axis of rotation of the idler and each of the axes of rotation of the driving and driven elements for thereby varying the speed ratio between the driving and driven elements accordingly. The idler carries a permanent magnet of such strength as to provide the necessary tractive friction between the idler and the driving and driven elements, at least one of the latter comprising a pair of oppositely facing circular discs axially slidable on a shaft and rotatable therewith. The oppositely facing circular discs are provided on their inner faces with respective conically contoured surfaces diverging, relative to each other, toward the outer peripheries of said discs and with which the outer peripheries of the two sides of the idler makes driving or rolling contact, the magnetic force of the magnet acting to maintain said driving or rolling contact.

In the drawings, FIG. 1 is an elevational view, mostly in outline with a partial cutaway, of one form of an infinitely variable speed ratio changing device embodying the invention;

FIG. 2 is a plan view, generally in section and taken along line II—II of FIG. 1, of the device shown in FIG. 1 as viewed in the direction indicated by the arrows;

FIG. 3 is a sectional view, taken along line III—III of FIG. 1 looking in the direction indicated by the arrows, of a certain portion of the structure;

FIG. 4 is an elevational view, generally in outline, of another form of the invention;

FIG. 5 is a plan view, mostly in section and taken along line V—V of FIG. 4, of the device shown in FIG. 4 as seen in the direction indicated by the arrows; and FIG. 6 is a side view, mostly in section and taken along line VI—VI of FIG. 4, of the device shown in FIG. 4 as viewed in the direction indicated by the arrows.

DESCRIPTION AND OPERATION—FIGS. 1, 2 AND 3

The infinitely variable speed ratio changing device, as shown in FIGS. 1, 2 and 3, comprises a supporting frame 1 for said device having a flat base 2 on each corner of which respective upwardly extending and parallel support arms 3, 4, 5 and 6, as viewed in FIG. 1, are provided. A shaft 7 is rotatably journaled in the upper extremities of the support arms 3 and 4, said shaft having an extending portion 8 which is drivingly connected to a power source (not shown) for rotation thereof. A shaft 9 is rotatably journaled in the upper extremities of the support arms 5 and 6, said shaft also having an extending portion 10 which may be drivingly connected to a device (not shown) to be driven therefrom.

A driving element 11 comprises a pair of oppositely facing circular discs 11 and 12 which are coaxially supported on the shaft 7 between the support arms 3 and 4 and are keyed to said shaft by a key 14 for rotation therewith, said discs, however, being axially slidable on said shaft for adjusting the axial space therebetween for a purpose to be hereinafter disclosed. The discs 12 and 13 are provided on their inner face with respective conically contoured surfaces 15 and 16 diverging, relative to each other, toward the outer peripheries thereof so as to form a V-shaped space between said discs. A driven element 17 comprises a pair of oppositely facing discs 18 and 19 which are also provided with respective conically contoured surfaces 20 and 21 to form a V-shaped space therebetween and are arranged on the shaft 9 in a manner similar to the arrangement of discs 11 and 12 on shaft 7. The discs 18 and 19 are keyed to shaft 9 by a key 22 for rotation therewith and are also axially movable thereon.

The base 2 of the supporting frame 1 is provided with a longitudinally extending groove 23 (see FIG. 3) formed on the upper side of said base and in which a carrier bracket 24 in the groove 23 can be slidably positioned in the groove by an adjusting screw 25 disposed in parallel relation to said groove, said screw having one end secured to said carrier and a screw-threaded portion 26 screwably supported in one end of the base 2, whereby, upon turning of said screw in one direction (clockwise, for example), the carrier bracket is moved in said groove toward the driving element 11, whereas turning of said screw in the opposite direction causes said carrier bracket to be moved toward the driven element 17.

The carrier bracket 24 has a pair of parallel support arms 27 and 28 extending upwardly from each end thereof, as viewed in FIGS. 1 and 2 of the drawings, and being parallel with the support arms 3, 4, 5 and 6. A shaft 29 is rotatably journaled at each end in the respective upper extremities of the support arms 27 and 28 in parallel relation to the shafts 7 and 9. A circular idler 30, rotatably supported on the shaft 29 between the support arms 27 and 28, is of such a diameter as to have diametrically opposite sectors disposed between the discs 12 and 13 of the driving element 11 and between the discs 18 and 19 of the driven element 17, respectively.

The idler 30 comprises an annular permanent magnet 31, such as a molded sintered ceramic magnet, for example, sandwiched between two circular steel side plates 32 and 33. The steel side plates 32 and 33 serve to condense the magnetic field into a more concentrated area, the flux density of said magnetic field being further increased with the idler 30 being disposed between the discs 12–13 and 18–19. The purpose of the idler 30 is to transfer driving torque from the driving element 11 to the driven element 17. Since the transmision of torque from element 11 to element 17 depend on the coefficient of rolling friction between the conical surfaces 15 and 16 and the steel plates 32 and 33 and between the conical surfaces 20 and 21 and said steel plates, a strong tractive force is provided by the magnet 31 to prevent slippage between the idler 30 and the driving and driven elements 11 and 17. Since the several discs 12, 13, 18 and 19 are axially slidable on the respective shafts 7 and 9, the magnetic force of magnet 31 draws said discs tightly against the respective steel plates 32 and 33 at the points of driving contact.

As was noted above, the position of the carrier bracket 24 in groove 23, and therefore its position relative to the driving and driven elements 11 and 17, which are spacially fixed relative to each other, is adjustable by the screw 25. The effect of changing or adjusting the position of carrier bracket 24 is to change the position of idler 30 relative to the driving and driven elements 11 and 17 or the respecive effective radii of said driving and driven elements. The effective radii of the driving and driven elements 11 and 17 are the radial distances from the driving points of contact of said elements with the idler 30 to the axes of the shafts 7 and 9, respectively, said radii being indicated in FIGS. 1 and 2 of the drawings by the reference characters A and B, respectively. Thus, assuming a given rotative speed for the driving element 11, which rotates according to the rate of rotation of the power-driven shaft 7, in the position in which the carrier bracket 24 and idler 30 are shown in the drawings, the effective radius A of the driving element 11 is shorter than the effective radius B of the driven element 17. The rotative speed of driven element 17, therefore, is less than the rotative speed of driving element 11. This relationship may be stated as follows: the ratio of the rotative speed of the driven element 17 to the rotative speed of the driving element 11 is inversely proportional to the ratio of radius B to radius A, or expressed mathematically, $S-17:S-11=A:B$, where $S-17$ and $S-11$ represent the rotative speeds of driven element 17 and driving element 11, respectively. Although the idler 30 is positionally adjustable relative to the driving element 11 and the driven element 17, so as to vary the respective effective radii A and B, the length of the radius of the idler 30 has no effect on the rotative speed relationship between said driving and driven elements, but, as is well known, the presence of said idler does affect the direction of rotation therebetween, such rotative directional relationship being indicated by respective arrows on FIG. 1 of the drawings.

The speed ratio of the driving and driven elements 11 and 17 can be adjusted to any ratio desired by simply shifting the position of idler 30 by the screw 25. If a one to one ratio is desired, for example, the position of carrier bracket 24 is so adjusted as to place idler 30 midway between the driving and driven elements 11 and 17 so that the radii A and B are equal. It should be apparent that if the idler 30 is positioned relative to the driving and driven elements 11 and 17 such that radius B is shorter than radius A, the rotative speed of the driven element 17 will be greater than the rotative speed of the driving element 11, which, as noted above, rotates at a speed determined by the power source (not shown).

At this point, the purpose of having the discs 12, 13, 18 and 19 axially slidable on the respective shafts 7 and 9 should be obvious. For instance, if the screw 25 is adjusted to cause the carrier bracket 24 and therefore the idler 30 to be moved in a right-hand direction, as viewed in the drawings, that sector of idler 30 occupying the V-shaped space between the discs 12 and 13 would be partially moved out of said V-shaped space a distance determined by the amount of adjustment of said screw while the sector occupying the V-shaped space between discs 18 and 19 would be moved further into said latter V-shaped space a corresponding distance. Thus, as the idler 30 moves further into the V-shaped space between the discs 18 and 19, the points of contact moving along the conical surfaces 20 and 21 in a converging direction force the two discs further apart by causing them to move axially apart on the shaft 9. On the other hand, as idler 30 moves further out of the V-shaped space between the discs 12 and 13, the points of contact moving along the conical surfaces 15 and 16 in a diverging direction premit the magnetic force of the magnet 31 to axially adjust the discs 12 and 13 on the shaft 7 by drawing them closer together and thereby maintain rolling contact between said discs and said idler.

DESCRIPTION AND OPERATION—
FIGS. 4, 5 AND 6

The embodiment of the invention, as shown in FIGS. 4, 5 and 6, comprises a U-shaped support frame 34 having a shaft 35 rotatably journaled at its opposite ends in the oppositely facing sides of said frame. The shaft 35 has an extending portion 36 which may be drivingly connected to a power source (not shown) for rotating the shaft. A driving member comprising a gear 37 is keyed on shaft 35 midway between the sides of support frame 34 for rotation with said shaft. A second shaft 38, conveniently located in parallel disposition to shaft 35, is also rotatably journaled in the sides of support frame 34 and also has an extending portion 39, as more clearly seen in FIG. 6, which may be drivingly connected to a device (not shown) to be driven by the torque transmitted from shaft 35, as will later be explained.

A driven member 40 comprising a pair of discs 41 and 42 having respective conically contoured inner surfaces 43 and 44 so as to form a V-shaped space therebetween similar to the discs 12, 13, 18 and 19 shown in FIG. 2, is supported on shaft 38 between the sides of support frame 34. The discs 41 and 42 are coupled to shaft 38 for rotation therewith by respective pins 45 and 46 the ends of which extend into longitudinal slots 47 and 48 formed in respective hubs of said discs, whereby said discs may move axially relative to said shaft but not angularly.

A U-shaped cradle or bracket 49 having parallel arms 50 and 51 extending from a base 52 is pivotally supported by said parallel arms on respective hubs 53 and 54 formed inwardly on journals 55 and 56 fixed in the sides of support frame 34 and in which the shaft 35 is journaled, said cradle being disposed within said support frame in a parallel relation thereto, that is, with said arms parallel to the sides of said support frame and with said base generally parallel to a base 57 of the support frame 34. An idler member 58 is rotatably supported midway between the arms 50 and 51 by a shaft 59 supported at the extremities of said arms in parallel relation to shafts 35 and 38.

The idler 58 comprises a gear 60 constantly in mesh with gear 37. Circular permanent magnet 61 and 62, similar to magnet 31 shown in FIG. 2, are fastened to opposite sides of gear 60 and are covered on their outer sides by respective circular steel plates 63 and 64 which serve in similar capacities as plates 32 and 33 on said magnet 31. The location of shaft 38 in support frame 34, and therefore of the driven member 41, and the lengths of arms 50 and 51 of cradle 49 are such that gear 60 meshes with with gear 37 and the idler 58 has a sector or portion thereof disposed in the V-shaped space between the discs 41 and 42 of the driven member 40 for transmitting driving torque from the driving gear 37 to said driven member 40.

As was noted above, the cradle 49 is pivotable on the hubs 53 and 54 about the axis of shaft 35, whereby the position of the idler 58 relative to the driven member 40 may be adjusted. Two screws 65 and 66 are mounted in the base 57 of support frame 34 so that the corresponding inner ends of said screws make contact with the base 52 of cradle 59 in such manner that if one screw is adjusted toward the base of said cradle while the other is adjusted away from said cradle base, the cradle is rotated about the hubs 53 and 54 to position the idler member 58 accordingly. For example, as seen in FIG. 4, if screw 65 is turned outwardly away from the cradle base 52 while screw 66 is turned inwardly toward said cradle base, the result is a counter-clockwise angular adjustment of cradle 49 and, therefore, a withdrawal of idler 58 from the V-shaped space between discs 41 and 42 an amount corresponding to the amount of adjustment of said screws. Thus the effective radius between the idler 58 and the driven member 40, indicated by the reference character C in FIGS. 4 and 6 of the drawings, is increased and the rotative speed of the driven member 40 is accordingly decreased relative to the rotative speed of the driving member 37. It should be apparent that adjustment of screws 65 and 66 in an opposite sense to that above discussed will produce the opposite effect of that immediately above described relative to the rotative speed ratio between the driving member 37 and the driven member 40.

If the effective radius between the driving member 37 and the idler 58, which in this embodiment of the invention is not adjustable in length, is indicated by the reference D, the rotative speed relationship between the driven member 40 and said driving member may be stated as follows: the ratio of the rotative speed of driven member 40 to the rotative speed of driving member 37 is inversely proportional to the ratio of radius C to radius D, or mathematically stated, $S\text{-}40 : S\text{-}37 = D : C$, where S-40 and S-37 represent the respective rotative speeds of the driven member 40 and the driving member 37. As is the case in the embodiment of the invention shown in FIGS. 1, 2 and 3 with respect to the idler 30, the particular length of the radius of idler 58 in the present embodiment also has no effect on the rotative speed relationship between the driven element 40 and the driving element 37, but the idler itself does affect the direction of rotation of the driven element as indicated by the arrows in FIG. 4.

Having now described the invention, what I claim as new and desire to secure by Letters Patent, is:

1. A variable speed ratio changing device comprising, in combination, a driving member, a driven member, said driving and driven members being rotatable about respective axes of rotation occuping a fixed relation to each other, an idler member operably disposed between and having frictional rolling contact with said driving and driven members for transmitting driving torque from the driving member to the driven member, said idler member being rotatable about an axis of rotation selectively shiftable to different positions relative to at least one of said axes of rotation of the driving and driven members for correspondingly varying the rotative speed ratio therebetween, and an annular permanent magnet coaxially carried by and rotatable with said idler member for exerting a magnetic force of constant preselected magnitude and thereby maintaining said frictional rolling contact between the idler member and the driving and driven members, respectively.

2. A variable speed ratio changing device, as defined in claim 1, further characterized in that the axis of rotation of said idler member is selectively shiftable to different positions relative to the respective axes of rotation of both the driving and driven members.

3. A variable speed ratio changing device comprising, in combination:
   (a) a support frame,
   (b) a first shaft rotatably supported in said frame and to which driving power may be applied for rotating it about a fixed axis of rotation,
   (c) a first pair of oppositely facing driving discs coaxially carried by and axially spaced on said first shaft for rotation therewith, each of said driving discs being axially slidable on said first shaft for varying the axial spacing therebetween and each having a conically contoured inner surface, oppositely facing each other, so as to form an annular V-shaped space therebetween diverging toward the respective outer peripheries of said driving discs,
   (d) a second shaft supported in said frame and rotatable about an axis of rotation parallel and in fixed relation to said axis of rotation of said first shaft,
   (e) a second pair of oppositely facing driven discs carried by and axially spaced on said second shaft for rotation therewith, each of said driven discs being axially slidable on said second shaft for varying the axial spacing therebetween and each having a conically contoured inner surface, oppositely facing each other, so as to form an annular V-shaped space therebetween diverging toward the respective outer peripheries of said driven discs,
   (f) an idler disc rotatable about an axis of rotation parallel to the respective axes of rotation of said first and second shafts, said idler being operatively disposed between said driving discs and said driven discs so as to make frictional rolling contact, at respective points of its periphery with respective oppositely facing conical surfaces of the two pairs of discs for transmitting driving torque from said first shaft to said second shaft,
   (g) a bracket member for rotatably supporting said idler disc, said bracket being slidably movable in said frame in one direction for causing said idler disc to be moved radially outwardly of the V-shaped space between said driven discs and radially inwardly in the V-shaped space between said driving discs to thereby cause axial movement of said driving discs apart from each other accordingly, and being slidably movable in said frame in an opposite direction for causing said idler disc to be moved radially outwardly of the V-shaped space between said driving discs and radially inwardly in the V-shaped space between said driven discs to thereby cause axial movement of said driven discs apart from each other, whereby the rotative speed ratio between said first shaft and said second shaft is decreased or increased, respectively, depending upon which direction said bracket is moved, an amount corresponding to the amount of movement of the bracket, and
   (h) magnetic means carried by said idler disc for exerting a constant axially directed force on said driving and driven discs for biasing the respective discs of each pair toward each other on said first and second shafts, respectively, with a force of constant preselected magnitude for causing said driving or driven discs to move axially toward each other upon movement of the idler disc in said outwardly direction and for maintaining positive frictional rolling contact between said idler disc and said driving and driven discs, notwithstanding any axial spacing adjustment of said driving and driven discs resulting from positional adjustment of the idler disc.

4. A variable speed ratio changing device, as defined in claim 3, further characterized in that said driving and driven discs are composed of a magnetic metal, and wherein said magnetic means comprises an annular permanent magnet interposed between and adjacent the outer peripheries of two circular plates comprising the idler disc for exerting a magnetic force of constant predetermined magnitude attracting the respective pairs of said driving and driven discs toward each other.

5. A variable speed ratio changing device comprising, in combination:
   (a) a support frame,
   (b) a first shaft rotatably supported in said frame and to which driving power may be applied for rotating it about a fixed axis of rotation, (c) a driving gear coaxially carried by said first shaft for rotation therewith, (d) a second shaft supported in said frame and rotatable about an axis of rotation parallel and in fixed relation to said axis of rotation of said first shaft, (e) a pair of oppositely facing discs carried by and axially spaced on said second shaft for rotation therewith, each of said discs being axially slidable on said second shaft for varying the axial spacing therebetween and each having a conically contoured inner surface, oppositely facing each other, so as to form an annular V-shaped space therebetween diverging toward the respective outer peripheries of said discs, (f) an idler gear, (g) a bracket member having a pair of supporting arms extending therefrom for rotatably supporting, at the extremities thereof, said idler gear in an operative position in which it meshes with and is driven by said driving gear and in which it is disposed between said discs so as to have its outer periphery make frictional rolling contact with both said conically contoured surfaces of said discs for thereby transmitting driving torque from said first shaft to said second shaft, (i) said bracket being pivotable, in one direction, about the common axis of said first shaft and said driving gear for causing said idler gear to be moved inwardly in the V-shaped space between said discs and thereby cause said discs to be moved axially apart, whereby the rotative speed ratio between said first shaft and said second shaft is increased, and (ii) being pivotable in an opposite direction about said common axis for causing said idler gear to be moved outwardly of said V-shaped space and thereby permit said discs to be moved axially toward each other, whereby the rotative speed ratio between said first shaft and said second shaft is decreased, and (h) magnetic means carried by said idler disc for exerting a constant axially directed force on said discs for biasing them toward each other on said second shaft with a force of constant preselected magnitude for causing such axial movement of said discs toward each other upon movement of said idler gear out of said V-shaped space and for maintaining positive frictional contact between said idler gear and said discs, notwithstanding any axial spacing adjustment of said discs resulting from positional changes of said idler gear.

6. A variable speed ratio changing device, as defined in claim 5, further characterized in that said discs are composed of a magnetic metal, and wherein said magnetic means comprises an annular permanent magnet interposed between and adjacent the outer peripheries of two circular plates comprising the idler gear for exerting a magnetic force of constant preselected magnitude attracting said discs toward each other.

References Cited by the Examiner

UNITED STATES PATENTS

| | | | |
|---|---|---|---|
| 831,685 | 9/1906 | Rossman | 74—210 X |
| 2,352,238 | 6/1944 | Wales | 74—210 X |
| 2,437,128 | 3/1948 | Rieber | 74—210 X |
| 2,441,693 | 5/1948 | Eastman | 74—210 |
| 2,586,260 | 2/1952 | Rennerfelt | 74—200 |

FOREIGN PATENTS

| | | |
|---|---|---|
| 866,586 | 2/1953 | Germany. |
| 968,884 | 4/1958 | Germany. |
| 776,310 | 6/1957 | Great Britain. |

DON A. WAITE, *Primary Examiner.*